Nov. 24, 1964  J. W. SMITH  3,158,250
CONVEYOR SYSTEM
Filed May 31, 1963  6 Sheets-Sheet 1
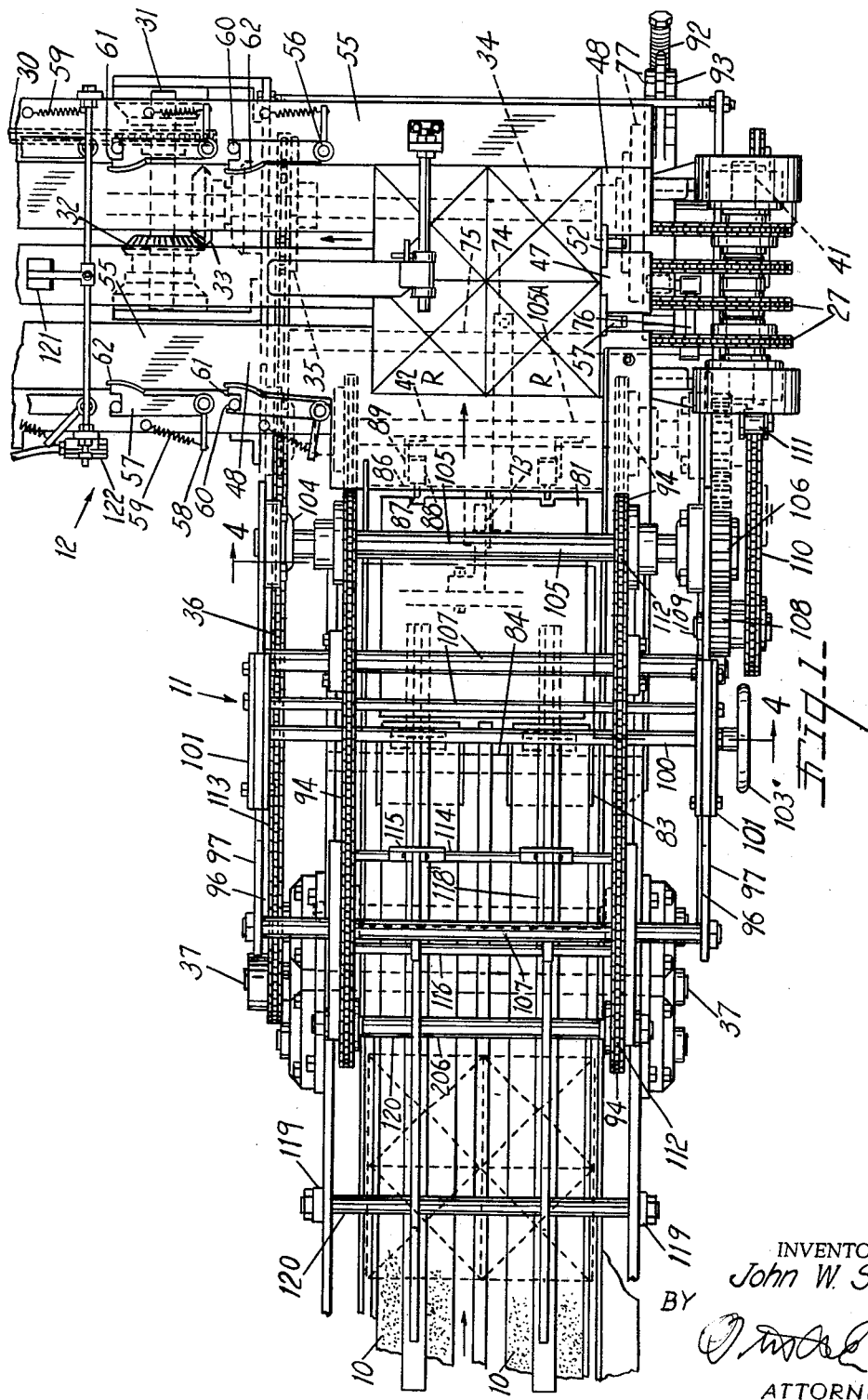
INVENTOR.
John W. Smith
BY
[signature]
ATTORNEY.

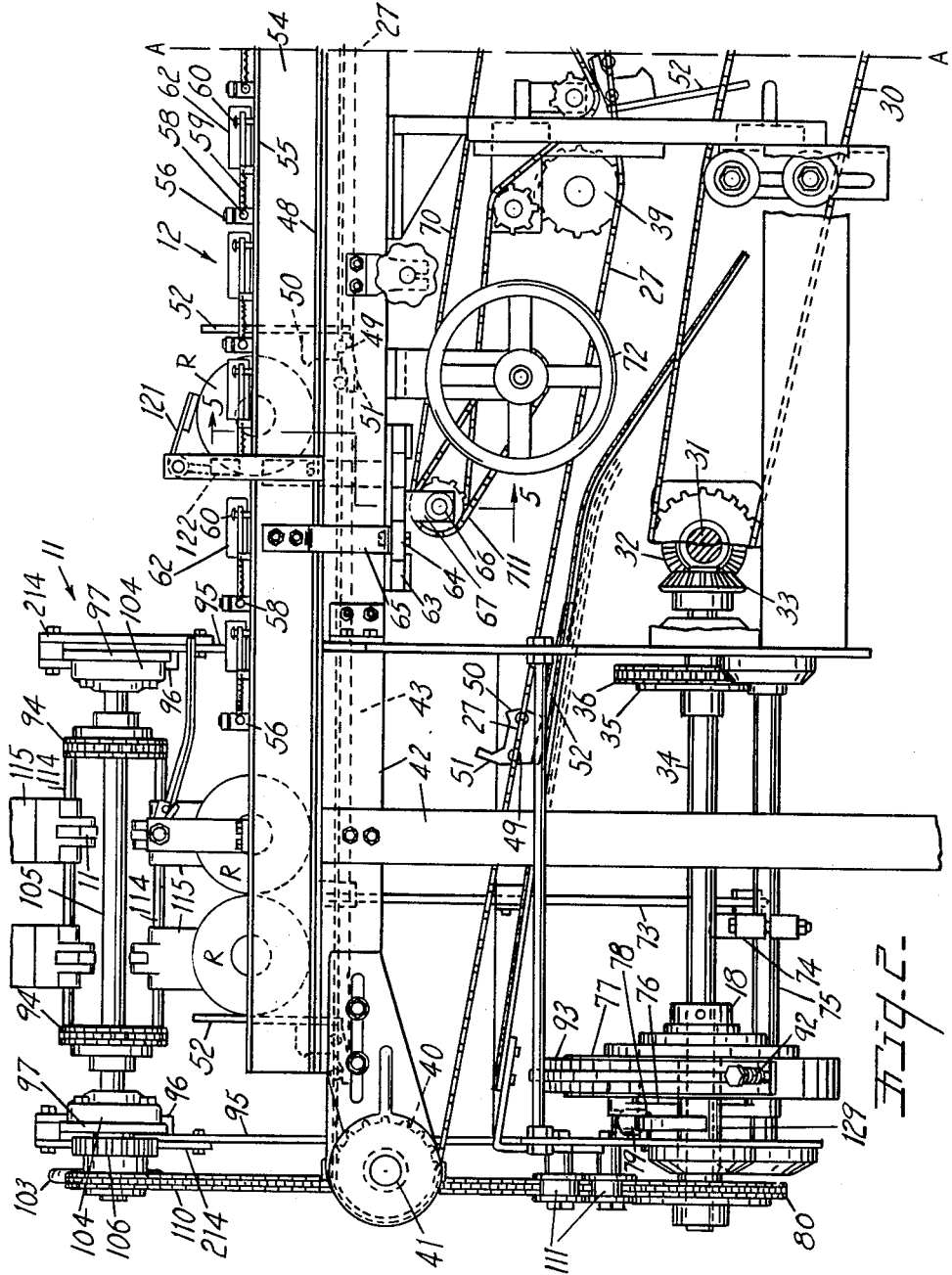

Nov. 24, 1964    J. W. SMITH    3,158,250
CONVEYOR SYSTEM
Filed May 31, 1963    6 Sheets-Sheet 3
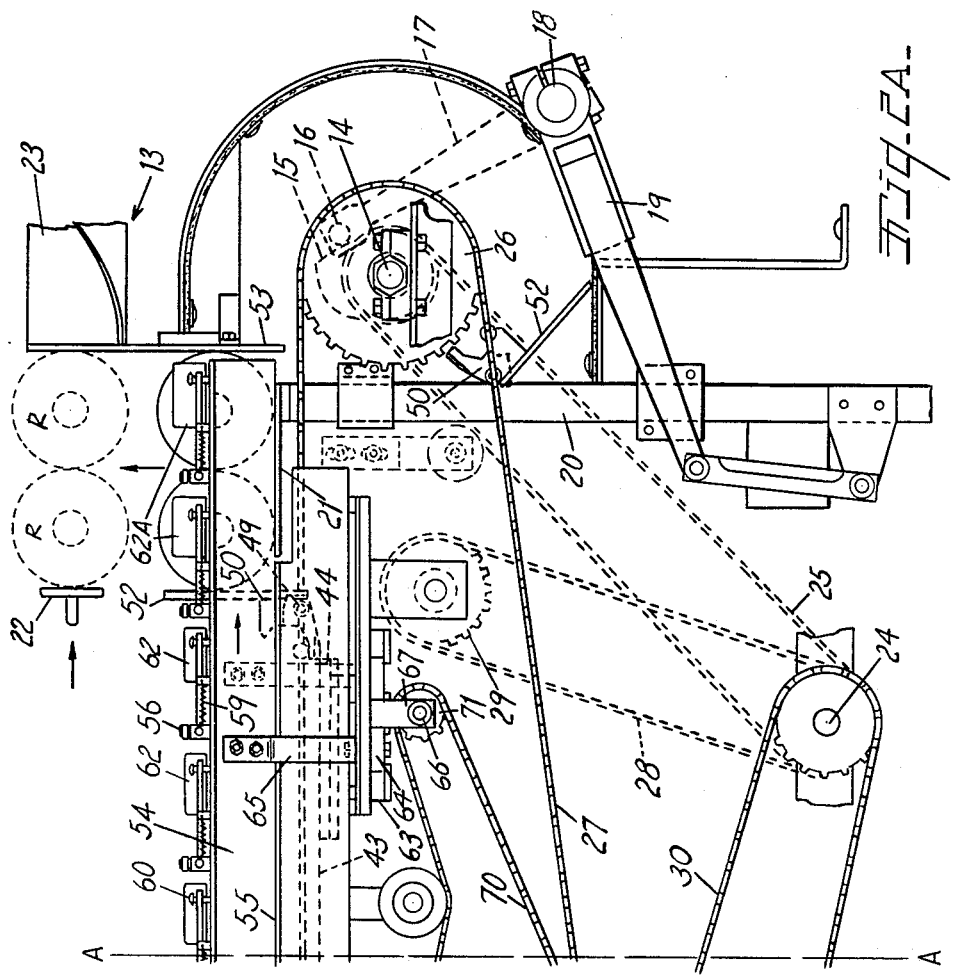
Fig. 2A.
INVENTOR.
John W. Smith
BY
ATTORNEY.

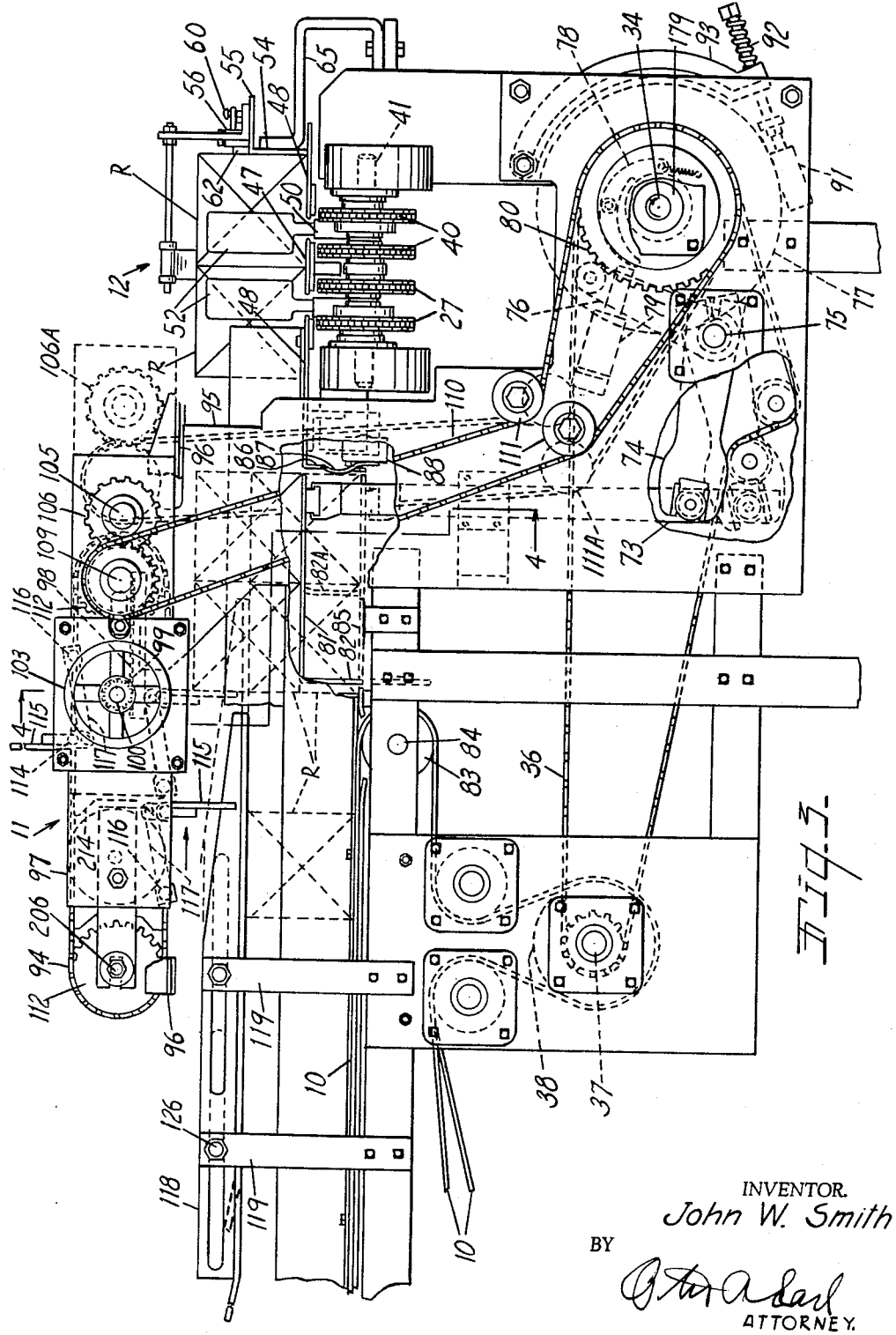

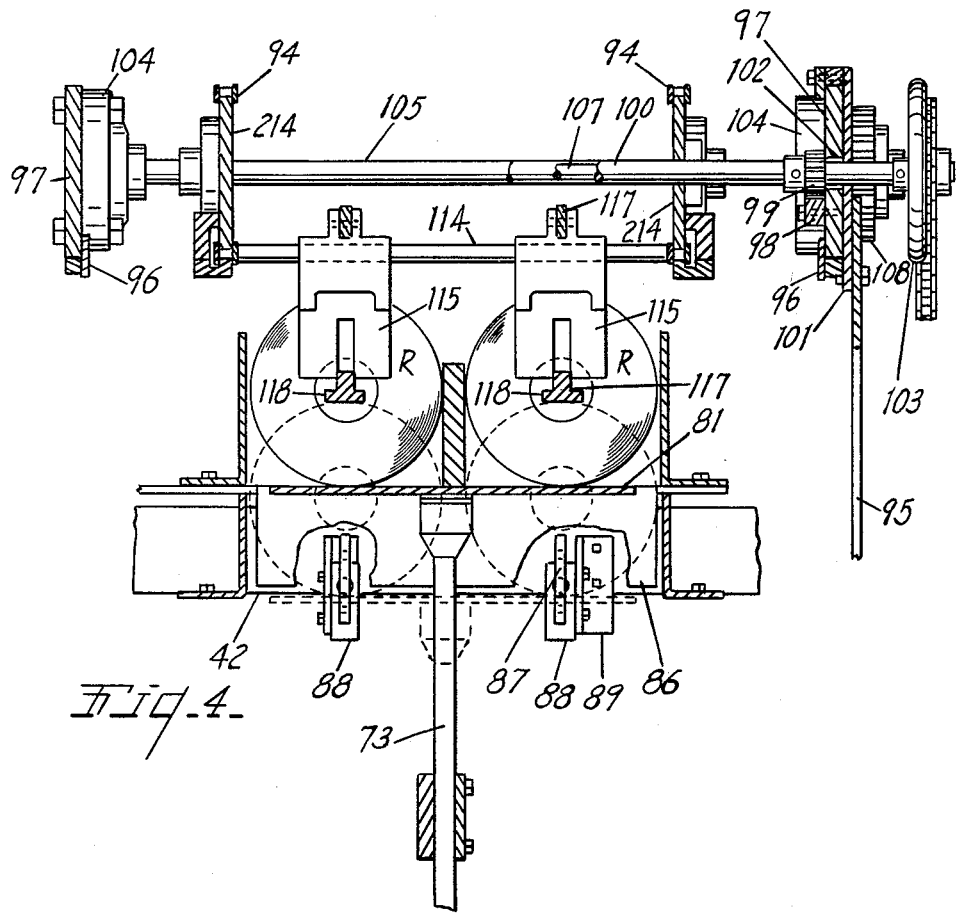

Nov. 24, 1964  J. W. SMITH  3,158,250
CONVEYOR SYSTEM
Filed May 31, 1963  6 Sheets-Sheet 6
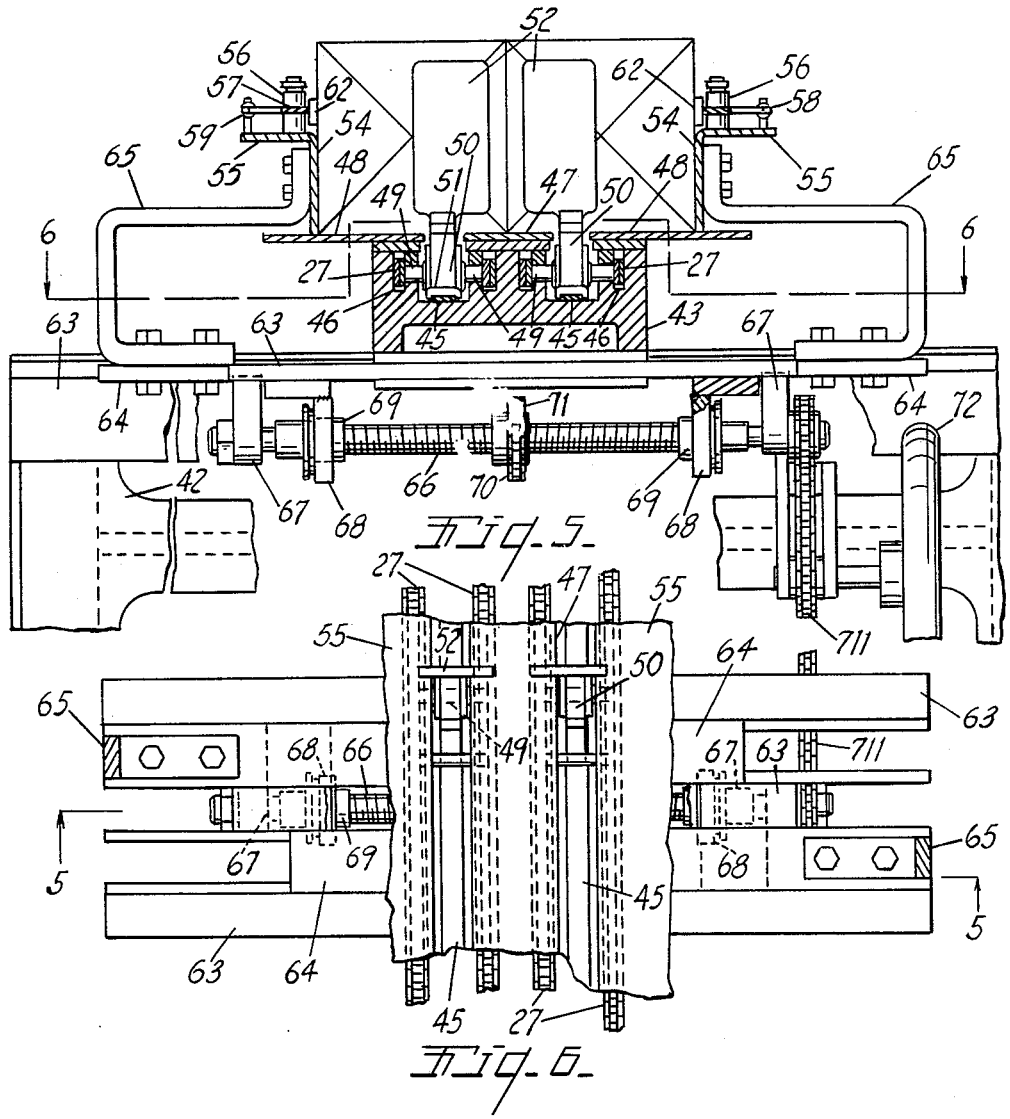
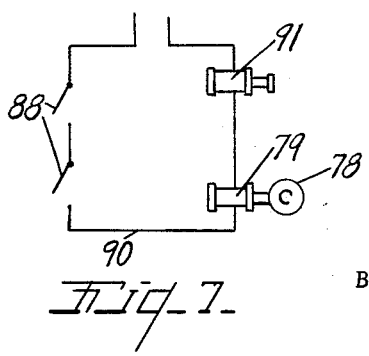
INVENTOR.
John W. Smith
BY
ATTORNEY.

United States Patent Office 3,158,250
Patented Nov. 24, 1964

3,158,250
CONVEYOR SYSTEM
John W. Smith, Battle Creek, Mich., assignor to Battle Creek Packaging Machines, Inc., Battle Creek, Mich.
Filed May 31, 1963, Ser. No. 284,569
12 Claims. (Cl. 198—21)

This invention relates to improvements in conveyor system.

The principal objects of this invention are:

First, to provide a conveyor system for advancing rolls of toilet tissue to a wrapping machine in such fashion that the ends of the rolls may be left loose and still arrive at the wrapping machine without irregular unrolling or wrinkling of the free ends of the rolls.

Second, to provide a conveyor for advancing rolls of toilet tissue having loose ends in single or plural tandem pairs in a direction transverse to the axes of the rolls without causing rolling of the rolls and unrolling or wrinkling of the free ends thereof.

Third, to provide a conveyor system for advancing rolls of toilet tissue in groups to a wrapping machine which wraps the group with overlapped folds on the ends of the rolls without unrolling or displacing free ends of tissue on the rolls.

Fourth, to provide a conveyor system having the foregoing characteristics and properties which is capable of high speed operation and which maintains accurate control of the rolls being conveyed throughout their travel to the wrapping machine and part way into the wrapping mechanism.

Other objects and advantages of the invention will be apparent from a consideration of the following description and claims. The drawings, of which there are six sheets, illustrate a highly practical form of the conveyor system.

FIG. 1 is a fragmentary top plan view of what may be considered as the rear end of the system illustrating the transfer mechanism between two conveyors of the system.

FIG. 2 is a fragmentary side elevational view of the rear end of the forwarding conveyor with parts of the transfer mechanism associated therewith.

FIG. 2A is a fragmentary side elevational view of the front end of the forwarding conveyor with portions of the wrapping machine associated therewith, the view being a continuation of FIG. 2 from the broken line A—A.

FIG. 3 is a fragmentary elevational view of the rear end of the forwarding conveyor including side elevational views of the supply conveyor and transfer mechanism, parts being broken away to illustrate structure therebehind.

FIG. 4 is a fragmentary vertical cross sectional view along the planes of the broken lines 4—4 in FIGS. 1 and 3 illustrating details of the roll transfer mechanism.

FIG. 5 is a fragmentary vertical cross sectional view taken along the plane of the broken line 5—5 in FIGS. 2 and 6 illustrating the adjusting mechanism and driving mechanism of the forwarding conveyor.

FIG. 6 is a fragmentary top plan view of the structure shown in FIG. 5.

FIG. 7 is a schematic wiring diagram of the controls of the electrical circuit for the conveyor system.

Manufacturing of high quality toilet tissue have found it desirable to merchandise their product in packages of plural rolls wrapped in transparent or other wrapping material and to further wrap the free ends of the individual rolls loose and unattached to the body of the roll rather then glued or otherwise attached to the body of the roll. The manufacturing process for rolls of toilet tissue of this type is arranged and adapted to deliver individual rolls successively to delivery belts with the axes of the cylindrical rolls parallel to the direction of the motion of the belts and the present invention provides means for receiving the rolls from such delivery belts and transferring them in variable numbered groups to a suitable wrapping machine.

Generally the conveyor system of the invention consists of a support and drive for the delivery belts two of which are indicated at 10, a transfer mechanism indicated generally at 11 and a forwarding conveyor and drive mechanism indicated generally at 12 which delivers to the intake end of a suitable wrapping machine portions of which are indicated generally at 13.

Considering first the drive connections and their relationship to the wrapping machine, FIG. 2A illustrates a drive shaft 14 of the wrapping machine which has a cam 15 operative on the follower roll 16 to swing the crank arm 17 on the rock shaft 18. A further crank arm 19 mounted near the center of the wrapping machine vertically reciprocates an elevator lift rod 20 positioned in the center of the machine to reciprocate an elevator platform 21 between the full line position shown in FIG. 2A to an elevated position to lift rolls R to the dotted line position where they are transferred by a pusher element 22 to a wrapping and sealing way, a portion of which is illustrated at 23. The wrapping machine may be of the type shown in Patent 2,982,077 in which upward motion of the elevator and the articles thereon drapes a sheet of wrapping material over the tops and ends of the package, but the details of the wrapping machine after the rolls are introduced thereinto form no part of the present invention and so are not illustrated in greater detail.

The drive shaft 14 drives a cross shaft 24 through the chain 25 and also drives sprockets 26 around which are threaded chain loops 27 of the forwarding conveyor to be described. The chain loops 28 and sprocket 29 driven from the shaft 24 form part of the forwarding mechanism of the wrapping machine and no further structure of this part is illustrated. The shaft 24 drives a rearwardly extending chain 30 which extends backwardly in FIGS. 1 and 2 to a cross shaft 31 having a bevel gear 32 thereon in driving engagement with the gear 33 and shaft 34. A sprocket 35 on the shaft 34 drives chain 36 which extends laterally alongside of the transfer mechanism and drives the shaft 37. The shaft 37 has drive rolls 38 thereon (see FIG. 3) driving the delivery belts 10 so that the delivery belts operate continuously when the wrapping machine is in operation. The chain loops 27 of the forwarding conveyor are also driven continuously with their lower reaches guided downwardly under guide sprockets 39 to rear idler sprockets 40 on the cross shaft 41.

Suitable supporting framework elements which are indicated by the common numeral 42 support a longitudinal conveyor support bar or beam member 43 which extends substantially the full length of the forwarding conveyor terminating at its forward end as shown in FIG. 2A at 44 short of the wrapping machine elevator 21. The support member 43 has two slots formed in its upper surface with anti-friction strips 45 therealong and with guide slots 46 on each side of the strips for supporting and guiding the chains 27. On its upper surface the support member carries a central plate 47 and two laterally extending side plates 48 forming a smooth surfaced advancing way with slots opening to the anti-friction strips 45. Between each pair of the four chains 27, there are connected pins 49 at spaced intervals which pivotally support angle shaped drive blocks 50 having downwardly and rearwardly projecting shoes 51 which ride upon the anti-friction strips 45. The upwardly projecting drive blocks 50 extend above the forwarding way and carry spaced roll forwarding flight bars 52 engageable with the rear sides of the rolls being advanced along the way. As the rolls are advanced in tandem pairs as illustrated or other selected groupings onto the wrapper elevator 21 and against the stop plate 53 in FIG. 2A, the shoes 51 drop off the forward end 44 of the support member and the flight bars tilt rearwardly to clear the rolls and the elevator as the elevator rises in timed relation with the forwarding conveyor.

As appears most clearly in FIGS. 1, 2, 2A and 5 conveyor way guide plates or side walls 54 are mounted along opposite sides of the forwarding way plates 48. The side plates 54 are laterally adjustable to accommodate single or double rows of rolls which will be described presently. At their upper edges the plates are outwardly turned flanges 55 positioned approximately opposite the centers of the rolls R and these flanges support upright pivot pins 56 with forwardly projecting arms 57 pivoted thereon. Laterally projecting arms 58 secured to the arms 57 are spring biased forwardly by springs 59 to urge the forward ends of the arms 57 inward of the way. Motion of the arms 57 is limited by pins or studs 60 in notches 61 in the forward ends of the arms. At their forward ends the arms 57 carry smooth upright longitudinally curved roll restraining pads 62 which are urged into frictional retarding engagement with the ends of the rolls R by springs 59 to resist and prevent rolling of the rolls as the rolls are advanced along the way plates 48. From FIG. 2A it will be seen that the restraining pads 62A positioned opposite the sides of the elevator 21 are higher than the other plates 62 so as to also restrain and locate the rolls on the elevator as the rolls are elevated to the wrapping machine. It is thus possible to advance rolls of tissue with free ends along the forwarding way without having the ends unrolled or wrinkled in any way.

The structure for laterally adjusting the side walls 54 and roll restraining pads carried thereby consists of cross bars 63 slidably supporting shoes or slides 64. The cross bars and slides are mounted in pairs near opposite ends of the forwarding conveyor chain support 43 and have upwardly and inwardly projecting brackets 65 connected to the slides to separately support the side walls 54. Oppositely threaded screws 66 are journaled in arms 67 depending from the fixed cross bars and the slides 64 of each pair of slides have yokes 68 engaging traveling nuts 69 on oppositely pitched ends of the screws. The two screws 66 are simultaneously adjustable by a central chain 70 trained over sprockets 71 and the rear screw 64 is manually operable by a chain 711 connected to the hand wheel 72. By rotating the screws 66, the traveling nuts and the slidably supported side wall supports connected thereto are moved inwardly or outwardly to accommodate single or double rows of rolls. In order to transfer the desired number of rolls into the forwarding way 48 in timed relation with the advancing flight bars 52 of the forwarding conveyor, the transfer mechanism indicated generally at 11 in FIGS. 1, 2 and 3 provides an upright reciprocable elevator rod or bar 73 positioned centrally beyond the ends of the supply belts 10 and to the left side of the forwarding way. The elevator bar 73 is reciprocated by a crank 74 on the rock shaft 75 and the shaft is oscillated by a crank arm 76 engaged with a box cam 77. The box cam 77 is freely rotatable about the longitudinal drive shaft 34 but is connectable thereto by a one revolution clutch mechanism having a spring biased engaging pawl 78 actuated by a solenoid 79 to clutch engaging position. The pawl 78 will engage the shaft 34 in only one position which corresponds or registers with the properly advanced positions of the several flight bars 52 so that the transfer mechanism can not operate except when it will advance a group of rolls onto the forwarding way ahead of a flight bar. The box cam 77 is mounted on a sleeve 129 on the shaft 34 which projects to the rear end of the machine and continuously drives the sprocket 80 for a purpose to be described presently.

The upper end of the transfer elevator bar 73 carries an interchangeable elevator plate 81 with a downturned trailing wall 82 positioned opposite the ends of the supply belts 10. The full line elevator plate 81 shown in the drawings and especially illustrated in FIG. 3 is sized to receive and elevate two tandem pairs of rolls from the supply belts and elevate them to the level of the forwarding way plates 48. When only a single pair of rolls positioned side by side are to be packaged, an alternate elevator plate with a downturned wall indicated by the dotted lines at 82A in FIG. 3 is substituted for the wider elevator plate. Simultaneously with this adjustment a spacer plate 85 is inserted to fill the space between the forward end of the supply belts and the adjacent edge of the smaller transfer elevator.

The continuously operating supply belts 10 will advance two rows of rolls in parallel endwise position onto either the wide or narrow transfer elevator plate 81 and against a stop plate 86 turned downwardly from the left or rear side of the plate 48 at the rear end of the forwarding conveyor way. This stop plate 86 has openings formed therein through which project the actuating levers 87 of a pair of control switches 88 secured by suitable brackets 89 to a frame element 42 of the machine. As appears in the circuit diagram in FIG. 7 these switches 88 are connected in series with the energizing circuit 90 for the solenoid 79 that controls the clutch pawl 78. Thus when the proper load for the elevator plate 81 is positioned thereon with the pressure of following rolls pressing the load against the switch actuating fingers 87, the switches will be closed and the clutch actuated to start the rotation of the box cam 77. Simultaneously solenoid 91 is energized to oppose and overcome the action of the spring 92 which normally urges a brake shoe 93 into engagement with the periphery of the box cam 77.

The package load of rolls elevated by the elevator plate 81 is transferred to the forwarding conveyor by an adjustably mounted overhead conveyor having a pair of spaced chains 94. The supporting framework at the rear end of the machine includes a pair of spaced upright plates 95 positioned on opposite sides of the supply belts and having slide ways 96 supported on their upper edges to adjustably support transfer conveyor support plates 97. The transfer conveyor support plates have racks 98 thereon which are engaged with gears 99 on an adjusting shaft 100 rotatably supported in the slide support plates 101 and extending through slots 102 in the conveyor support plates 97. The shaft 100 is manually adjustable by means of the hand wheel 103 to move the transfer conveyor support plates toward or away from the forwarding conveyor and way.

The transfer conveyor support plates 97 carry bearings 104 for a forward drive shaft 105 and a rear idler shaft 206 as well as connecting rods 107. The shaft 105 carries a gear 106 on its rear end drivingly engaged with a mating gear 108 on the stub shaft 109. The gears 106 and 108 move toward and away from the forwarding conveyor on the slides 96 and are driven by a chain 110 from the previously described sprocket 80. Guide rollers 111 having alternate adjusted positions shown in dotted lines at 111A keep the chain 110 taut in adjusted positions of the gears.

The shafts 105 and 206 support spaced sprockets 112 driven from the forward shaft 105 and driving transfer chain loops 94. The connecting rods 107 support chain guide plates 214 and the chain loops are continuously driven from the sprocket 80 with a forwardly advancing reach located above the raised positions of the rolls R on the transfer elevator. At spaced points along the chain loops 94 are connected traveling cross bars 114 having flight bars 115 pivotally mounted thereon. Other traveling bars 116 connected between chains 94 in trailing relation to the flight bars are connected to the flight bars by tilting links 117 so that the flight bars 115 maintain perpendicular positions as they start upwardly around the right end of the transfer conveyor as appears in FIG. 3. Cross bars 114 move upwardly around the sprockets 214 but the tilting links 117 being connected to the trailing bars 116 which are still at the level of the lower reach of the chains 94 prevent the flight bars or pushers 115 from swinging along radii of the sprockets so the flight bars rise more or less in vertical planes until they clear the rolls and until the trailing bars 116 start upwardly around the sprockets. This type of flight bar drive is old per se and so is not disclosed in greater detail. The gear ratio of the sprocket 80 to the meshing gears 108 and 106 is such that a flight bar 115 is advanced across the transfer elevator plate 81 with each cycle of the transfer mechanism to transfer a group of rolls onto the forwarding conveyor way in timed relation with the advancing flight bars 52 of the forwarding conveyor. Adjustment of the transfer conveyor by means of the racks 98 and hand wheel 103 will advance the entire transfer conveyor to the dotted line position shown at 106A so that a single pair of rolls on the narrower transfer elevator plate 82A will be properly advanced onto the forwarding conveyor.

In order to insure proper feeding engagement between the incoming rolls and the feeding or delivery belts 10 holddown rails 118 are longitudinally adjustably supported over the delivery belts by uprights 119 and cross bars 120 to extend approximately to the outer end of the delivery belts in either of the adjusted positions of the belts.

Where desired a feeler or sensing finger 121 may be pivotally supported over the forwarding way to be lifted by contact with rolls advanced along the way and to actuate a limit switch 122 which may be connected to control the paper feed to the wrapping machine and interrupt the paper feed when there is no group of rolls ready to be wrapped in the wrapping machine.

What is claimed as new is:

1. A conveyor system arranged to receive rolls of toilet tissue in pairs on parallel receiving belts with the axes of the rolls parallel to the belts and forward the rolls in single or double tandem pairs parallel to their axes to a wrapping machine having a vertically reciprocable initial wrap forming element, said system comprising, a flat way terminating at its forward end in adjacent roll transfer relation to the lowered position of said initial wrap forming element with a fixed stop at its forward edge, laterally adjustable side walls mounted alongside of said way and projecting along the sides of said initial forming element in retaining and guiding relation to the ends of the rolls in said tandem pairs, said side walls terminating below the tops of said rolls at approximately the centers thereof, a roll forwarding conveyor including a chain loop driven in timed relation to said initial wrap element and extending beyond the ends of said way and the wrap element, flights tiltably connected to said chain and having depending actuating fingers, a support track located under said way and extending beyond the rear in-feed end of the way to engage said fingers and project said flights to upright roll advancing position, said way having slots formed therein through which the ends of said flights project, a plurality of roll restraining arms pivotally mounted on the tops of said side walls and having roll restraining pads on their swinging ends spring biased into frictionally dragging engagement with the upper portions of said rolls, said roll restraining levers including two with extra high pads located at the sides of said initial fold element, means for introducing said pairs of rolls to said way including a receiving plate at the rear end of said way located over said support track and above the level of said belts with a stop wall at one side as a continuation of one of said side walls, a vertically reciprocable elevator rod with interchangeable elevator plates attachable to its upper end reciprocable between the level of said belts and the level of said receiving plate on the opposite side of the receiving plate from said stop wall, a second stop wall positioned along the end of said elevator plates to the edge of said receiving plate, sensing switches having actuating elements located at said second stop wall to sense the location of single or tandem pairs of rolls on said elevator plates, a supporting framework positioned on opposite sides of said elevator and having slideways thereon above the level of said receiving plate, transfer conveyor support plates slidably supported on slideways and having racks thereon, a load adjusting shaft journaled in said framework and projecting through slots in said support plates with gears on the shaft engageable with said racks to move said support plates between single pair and double pair roll transferring positions, an overhead conveyor having spaced chain loop guides supported from said support plates, a drive shaft journaled in the leading ends of said support plates and guides and having sprockets thereon driving spaced transfer chain loops around said guides, pusher flights rockably carried on cross bars connected between said transfer chain loops and maintained in vertical positions at the leading ends of said transfer chain loops by links connected to other cross bars trailing said first cross bars on the loops, roll hold down rails longitudinally adjustably mounted over said belts and under said pusher flights, a drive connection from said forwarding conveyor to said belts connected to continuously drive said belts, alternate bearing mountings for supporting idler pulleys at the leading ends of said belts adjacent the edges of said interchangeable elevator plates, means including a cyclically operated clutch driven from said wrapping machine and connected to reciprocte said elevator rod, and an electrically actuated control connected to condition said clutch to engage in timed relation to said roll forwarding conveyor, said control being electrically connected through said sensing switches to be actuated only when the prescribed load is on the selected elevator plate.

2. A conveyor system arranged to receive rolls of toilet tissue in pairs on parallel receiving belts with the axes of the rolls parallel to the belts and forward the rolls in single or double tandem pairs parallel to their axes to a wrapping machine having a vertically reciprocable initial wrap forming element, said system comprising, a flat way terminating at its forward end in adjacent roll transfer relation to the lowered position of said initial wrap forming element with a fixed stop at its forward edge, laterally adjustable side walls mounted alongside of said way in retaining and guiding relation to the ends of the rolls in said tandem pairs, said side walls terminating below the tops of said rolls, a roll worwarding conveyor including a chain loop driven in timed relation to said initial wrap element and extending beyond the ends of said way and the wrap element, flights tiltably connected to said chain and having depending actuating fingers, a support track located under said way and extending beyond the rear in-feed end of the way to engage said fingers and project said flights to upright roll advancing position, said way having slots formed therein through which the ends of said flights project, a plurality of roll restraining arms pivotally mounted on the tops of said side walls and having roll restraining pads on their swinging ends spring biased into frictionally dragging engagement with the upper portions of said rolls, means for introducing said pairs of rolls to said way including a receiving plate at the rear end of said way located over said support track and above the level of said belts with a stop wall at one side as a continuation of one of said side walls, a vertically reciprocable elevator rod with interchangeable elevator plates attachable to ts upper end reciprocable between the level of said belts and the level of said receiving plate on the opposite side of the receiving plate from said stop wall, a second stop wall positioned along the end of said elevator plates to the edge of said receiving plate, sensing switches having actuating elements located at said second stop wall to sense the location of single or tandem pairs of rolls on said elevator plates, a supporting framework positioned on opposite sides of said elevator and having slideways theron above the level of said receiving plate, transfer conveyor support plates slidably supported on slideways and having racks thereon, a load adjusting shaft journaled in said framework and projecting through slots in said support plates with gears on the shaft engageable with said racks to move said support plates between single pair and double pair roll transferring positions, an overhead conveyor having spaced chain loop guides supported from said support plates, a drive shaft journaled in the leading ends of said support plates and guides and having sprockets thereon driving spaced transfer chain loops around said guides, pusher flights rockably carried on cross bars connected between said transfer chain loops and maintained in vertical positions at the leading ends of said transfer chain loops by links connected to other cross bars trailing said first cross bars on the loops, a drive connection from said forwarding conveyor to said belts connected to continuously drive said belts, alternate bearing mountings for supporting idler pulleys at the leading ends of said belts adjacent the edges of said interchangeable elevator plates, means including a cyclically operated clutch driven from said wrapping machine and connected to reciprocate said elevator rod, an electrically actuated control connected to condition said roll forwarding conveyor, said control being electrically connected through said sensing switches to be actuated only when the prescribed load is on the selected elevator plate.

3. A conveyor system arranged to receive rolls of paper in pairs on parallel receiving belts with the axes of the rolls parallel to the belts and forward the rolls in tandem pairs parallel to their axes to a wrapping machine having a verticaly reciprocable initial wrap forming element, said system comprising, a flat way terminating at its forward end in adjacent roll transfer relation to the lowered position of said initial wrap forming element with a fixed stop at the forward edge of the forming element, side walls mounted along side of said way and projecting along the sides of said initial forming element in retaining and guiding relation to the ends of the rolls in said tandem pairs, said side walls terminating below the tops of said rolls at approximately the centers thereof, a roll forwarding conveyor including a chain loop driven in timed relation to said initial wrap element and extending beyond the ends of said way and the wrap element, flights tiltably connected to said chain and having depending actuating fingers, a support track located under said way and extending beyond the rear in-feed end of the way to engage said fingers and project said flights to upright roll advancing position, said way having slots formed therein through which the ends of said flights project, a plurality of roll restraining arms pivotally mounted on said side walls and having roll restraining pads on their swinging ends spring biased into frictionally dragging engagement with the upper portions of said rolls, said roll restraining levers including at least one pad located at each side of said initial fold element, means for introducing said pairs of rolls to said way including a receiving plate at the rear end of said way located over said support track and above the level of said belts with a stop wall at one side, a vertically reciprocable elevator rod with an elevator plate attached to its upper end reciprocable between the level of said belts and the level of said receiving plate on the opposite side of the receiving plate from said stop wall, a second stop wall positioned along the end of said elevator plate adjacent to the edge of said receiving plate, sensing switches having actuating elements located at said second stop wall to sense the location of a pair of rolls on said elevator plate, a supporting framework positioned on opposite sides of said elevator, a transfer conveyor supported on said framework above the level of said receiving plate, said transfer conveyor having spaced chain loop guides with a drive shaft journaled at the leading ends of said guides and having sprockets thereon driving spaced transfer chain loops around said guides, pusher flights rockably carried on cross bars connected between said transfer chain loops and maintained in vertical positions at the leading ends of said transfer chain loops, roll hold down rails mounted over said belts and under said pusher flights, a drive connection from said forwarding conveyor to said belts connected to continuously drive said belts, means including a cyclically operated clutch driven from said wrapping machine and connected to reciprocate said elevator rod, and an electrically actuated control connection to condition said clutch to engage in timed relation to said roll forwarding conveyor, said control being electrically connected through said sensing switches to be actuated only when the prescribed load is on the elevator plate.

4. A conveyor system arranged to receive rolls of paper in pairs on parallel receiving belts with the axes of the rolls parallel to the belts and forward the rolls in tandem pairs parallel to their axes to a wrapping machine having a vertically reciprocable initial wrap forming element, said system comprising, a flat way terminating at its forward end in adjacent roll transfer relation to the lowered position of said initial wrap forming element with a fixed stop at the forward edge of the forming element, side walls mounted alongside of said way and projecting along the sides of said initial forming element in retaining and guiding relation to the ends of the rolls in said tandem pairs, said side walls terminating below the tops of said rolls, a roll forwarding conveyor including a chain loop driven in timed relation to said initial wrap element and extending beyond the ends of said way and the wrap element, flights tiltably connected to said chain and having depending actuating fingers,
a support track located under said way and extending beyond the rear in-feed end of the way to engage said fingers and project said flights to upright roll advancing position,
said way having slots formed therein through which the ends of said flights project,
a plurality of roll restraining arms pivotally mounted on said side walls and having roll restraining pads on their swinging ends spring biased into frictionally dragging engagement with the upper portions of said rolls,
means for introducing said pairs of rolls to said way including a receiving plate at the rear end of said way located over said support track and above the level of said belts with a stop wall at one side,
a vertically reciprocable elevator rod with an elevator plate attached to its upper end reciprocable between the level of said belts and the level of said receiving plate on the opposite side of the receiving plate from said stop wall,
a second stop wall positioned along the end of said elevator plate adjacent to the edge of said receiving plate,
sensing switches having actuating elements located at said second stop wall to sense the location of said elevator,
a transfer conveyor supported on said framework above the level of said receiving plate,
said transfer conveyor having spaced chain loop guides with a drive shaft journaled at one end of said guides and having sprockets thereon driving spaced transfer chain loops around said guides,
pusher flights rockably carried on cross bars connected between said transfer chain loops and maintained in vertical positions at the leading ends of said transfer chain loops,
a drive connection from said forwarding conveyor connected to drive said belts,
means including a cyclically operated clutch driven from said wrapping machine and connected to reciprocate said elevator rod,
and an electrically actuated control connection to condition said clutch to engage in timed relation to said roll forwarding conveyor,
said control being electrically connected through said sensing switches to be actuated only when the prescribed load is on the elevator plate.

5. A conveyor system arranged to receive rolls of paper in pairs on parallel receiving belts and forward the rolls in tandem pairs parallel to the axes to a wrapping machine having a vertically reciprocable initial wrap forming element, said system comprising,
a flat way terminating at its forward end in adjacent roll transfer relation to the lowered position of said initial wrap forming element with a fixed stop at the forward edge of the forming element,
side walls mounted alongside of said way and projecting along the sides of said initial forming element in retaining and guiding relation to the ends of the rolls in said tandem pairs,
said side walls terminating below the tops of said rolls at approximately the centers thereof,
a roll forwarding conveyor including a chain loop driven in timed relation to said initial wrap element and extending beyond the ends of said way and the wrap element,
flights tiltably connected to said chain and having depending actuating fingers,
a support track located under said way and extending beyond the rear in-feed end of the way to engage said fingers and project said flights to upright roll advancing position,
said way having slots formed therein through which the ends of said flights project,
a plurality of roll restraining arms pivotally mounted on the tops of said side wall and having roll restraining pads on their swinging ends spring biased into frictionally dragging engagement with the upper portions of said rolls, said roll restraining levers including two with extra high pads located at the sides of said initial fold element,
and means for introducing said pairs of rolls in side by side tandem relation.

6. A conveyor system arranged to receive rolls of paper in pairs on parallel receiving belts and forward the rolls in tandem pairs parallel to their axes to a wrapping machine having a vertically reciprocable initial wrap forming element, said system comprising,
a flat way terminating at its forward end in adjacent roll transfer relation to the lowered position of said initial wrap forming element with a fixed stop at the forward edge of the forming element,
side walls mounted alongside of said way and projecting along the sides of said initial forming element in retaining and guiding relation to the ends of the rolls in said tandem pairs,
said side walls terminating below the tops of said rolls,
a roll forwarding conveyor including a chain loop driven in timed relation to said initial wrap element and extending beyond the ends of said way and the wrap element,
flights tiltably connected to said chain,
said way having slots formed therein through which the ends of said flights project,
a plurality of roll restraining arms pivotally mounted on said side wall and having roll restraining pads on their swinging ends spring biased into frictionally dragging engagement with the upper portions of said rolls, said roll restraining levers including at least one with extra high pads locating at each side of said initial wrap forming element,
and means for introducing said pairs of rolls in side by side tandem relation.

7. A conveyor for advancing rolls of toilet tissue with unsealed ends to a vertically reciprocable elevator of a wrapping machine comprising,
a flat way having spaced slots formed therein with chain supports positioned therebelow,
said way terminating adjacent the lowered position of said elevator and said chain supports terminating short of the elevator,
conveyor chain loops driven in timed relation to said elevator and having upper reaches trained along said supports and below said elevator,
an elevator push rod reciprocable between said chain loops,
side walls laterally adjustably mounted over said way and extending therebeyond alongside said elevator to receive single or plural rolls between the side walls with the axes of the rolls transverse to the way and with the tops of the rolls projecting above the side wall,
pusher flights pivoted to said chains and projecting through said slots with angled followers on their inner ends engageable in trailing flight erecting engagement with said supports,
a plurality of arms mounted on spaced upright pivots on the tops of said side walls and having their leading ends spring biased inwardly of said way,
restraining pads on the leading ends of said arms engageable with the ends of rolls on said way with the shoes on the arms at the leading ends of the walls alongside said elevator being vertically higher than the other shoes,
a roll stop positioned across the end of said way at the leading side of said elevator,
and means for delivering rolls in plural tandem groups and single or plural end to end groups between said flights.

8. A conveyor for advancing rolls of toilet tissue with unsealed ends to a vertically reciprocable elevator of a wrapping machine comprising,
a flat way having spaced slots formed therein with chain supports positioned therebelow,
said way terminating adjacent the lowered position of said elevator and said chain supports terminating short of the elevator,
conveyor chain loops driven in timed relation to said elevator and having upper reaches trained along said supports and below said elevator,
an elevator push rod reciprocable between said chain loops,
side walls laterally adjustably mounted over said way and extending therebeyond alongside said elevator to receive single or plural rolls between the side walls with the axes of the rolls transverse to the way and with the tops of the rolls projecting above the side wall,
pusher flights pivoted to said chains and projecting through said slots with angled followers on their inner ends engageable in trailing flight erecting engagement with said supports,
a plurality of arms mounted on spaced upright pivots on the tops of said side walls and having their leading ends spring biased inwardly of said way,
restraining pads on the leading ends of said arms engageable with the ends of rolls on said way,
a roll stop positioned across the end of said way at the leading side of said elevator,
and means for delivering rolls in plural tandem groups and single or plural end to end groups between said flights.

9. A conveyor for advancing rolls of paper with unsealed ends to a vertically reciprocable elevator of a wrapping machine comprising,
a flat way having a slot formed therein with a chain support positioned therebelow,
said way terminating adjacent the lowered position of said elevator and said chain supporting terminating short of the elevator,
a conveyor chain loop driven in timed relation to said elevator and having an upper reach trained along said support and below said elevator,
an elevator push rod reciprocable alongside said chain loop,
side walls mounted along said way and extending therebeyond alongside said elevator to receive rolls between the side walls with the axes of the rolls transverse to the way and with the tops of the rolls projecting above the side walls,
pusher flights pivoted to said chain and projecting through said slot with angled followers on their inner ends engageable in trailing flight erecting engagement with said support,
a plurality of arms mounted on spaced upright pivots on the tops of said side walls and having their leading ends spring biased inwardly of said way,
restraining pads on the leading ends of said arms engageable with the ends of rolls on said way with the shoes on the arms at the leading ends of the walls alongside said elevator being vertically higher than the other shoes,
a roll stop positioned across the end of said way at the leading side of said elevator,
and means for delivering rolls in tandem groups between said flights.

10. A conveyor for advancing rolls of paper with unsealed ends to a vertically reciprocable elevator of a wrapping machine comprising,
a flat way having a slot formed therein with a chain support positioned therebelow,
said way terminating adjacent the lowered position of said elevator and said chain support terminating short of the elevator,
a conveyor chain loop driven in timed relation to said elevator and having an upper reach trained along said support and below said elevator,
an elevator push rod reciprocable alongside said chain loop,
side walls mounted along said way and extending therebeyond alongside said elevator to receive rolls between the side walls with the axes of the rolls transverse to the way and with the tops of the rolls projecting above the side walls,
pusher flights tiltably mounted on said chain and projecting through said slot,
a plurality of arms mounted on spaced upright pivots on the tops of said side walls and having their leading ends spring biased inwardly of said way,
restraining pads on the leading ends of said arms engageable with the ends of rolls on said way with the shoes and arms at the leading ends of the walls alongside said elevator,
a roll stop positioned across the end of said way at the leading side of said elevator,
and means for delivering rolls in tandem groups between said flights.

11. A conveyor for advancing rolls of paper with unsealed ends to a vertically reciprocable elevator of a wrapping machine comprising,
a flat way having a slot formed therein,
said way terminating adjacent the lowered position of said elevator,
a conveyor chain loop driven in timed relation to said elevator and having an upper reach trained below said elevator,
side walls mounted along said way and extending therebeyond alongside said elevator to receive rolls transverse to the way and with the tops of the rolls projecting above the side wall,
pusher flights tiltably connected to said chain and projecting through said slot,
a plurality of arms mounted on spaced upright pivots on the tops of said side walls and having their leading ends spring biased inwardly of said way,
restraining pads on the leading ends of said arms engageable with the ends of rolls on said way,
a roll stop positioned across the end of said way at the leading side of said elevator,
and means for delivering rolls in plural tandem groups between said flights with the axes of the rolls transverse to the way.

12. A conveyor for advancing rolls of paper with unsealed ends to a vertically reciprocable elevator of a wrapping machine comprising,
a flat way having a slot formed therein,
said way terminating adjacent the lowered position of said elevator,
a conveyor chain loop driven in timed relation to said elevator and having an upper reach trained below said elevator,
side walls mounted along said way to receive rolls transverse to the way,
pusher flights tiltably connected to said chain and projecting through said slot,
a plurality of arms mounted on spaced upright pivots on said side walls and having their leading ends spring biased inwardly of said way,
restraining pads on the leading ends of said arms engageable with the ends of rolls on said way,
a roll stop positioned across the end of said way at the leading side of said elevator,
and means for delivering rolls between said flights with the axes of the rolls transverse to the way.

References Cited in the file of this patent
FOREIGN PATENTS
553,719     Great Britain _____ June 2, 1943